United States Patent [19]

Lutz et al.

[11] Patent Number: 4,740,007
[45] Date of Patent: Apr. 26, 1988

[54] TRUCK SEMI-TRAILER AND FULL TRAILER COMBINATION IN WHICH THE SEMI-TRAILER AND THE FULL TRAILER CAN BE LOCKED TOGETHER FOR BACKING

[76] Inventors: David E. Lutz; David W. Lutz, both of P.O. Box 810, Carlisle, Pa. 17013

[21] Appl. No.: 21,656

[22] Filed: Mar. 4, 1987

[51] Int. Cl.⁴ .............................................. B62D 53/00
[52] U.S. Cl. ..................................... 280/408; 414/474; 414/495
[58] Field of Search ................. 280/408, 474, DIG. 9, 280/DIG. 14, DIG. 8; 414/495, 474, 484, 485

[56] References Cited

U.S. PATENT DOCUMENTS

| | | | |
|---|---|---|---|
| 3,105,703 | 10/1963 | Rittenhouse | 280/415 R |
| 3,163,306 | 12/1964 | Bennett et al. | 280/408 |
| 3,237,966 | 3/1966 | Ayers | 280/408 |
| 3,401,955 | 9/1968 | Alton | 280/408 |
| 3,484,852 | 12/1969 | Norrie et al. | 280/408 |
| 3,532,354 | 10/1970 | Fulmer et al. | 280/43.23 |
| 3,612,575 | 10/1971 | Stewart | 280/408 |
| 3,841,511 | 10/1974 | Haun | 280/DIG. 8 |
| 4,111,451 | 9/1978 | Pinto | 280/474 |
| 4,303,258 | 12/1981 | Davis | 280/403 |
| 4,475,740 | 10/1984 | Strick | 280/403 |
| 4,592,693 | 6/1986 | Perrot | 280/43.23 |

Primary Examiner—John A. Pekar
Attorney, Agent, or Firm—Oblon, Fisher, Spivak, McClelland & Maier

[57] ABSTRACT

A cargo-carrying vehicle including a forward cargo-carrying body; a rearward cargo-carrying body; and an apparatus for locking the forward cargo-carrying body and the rearward cargo-carrying body together so that the forward and rearward cargo-carrying bodies can be backed as one unit. In some embodiments, the apparatus can provide at least three spacings between the forward cargo-carrying body and the rearward cargo-carrying body.

134 Claims, 11 Drawing Sheets

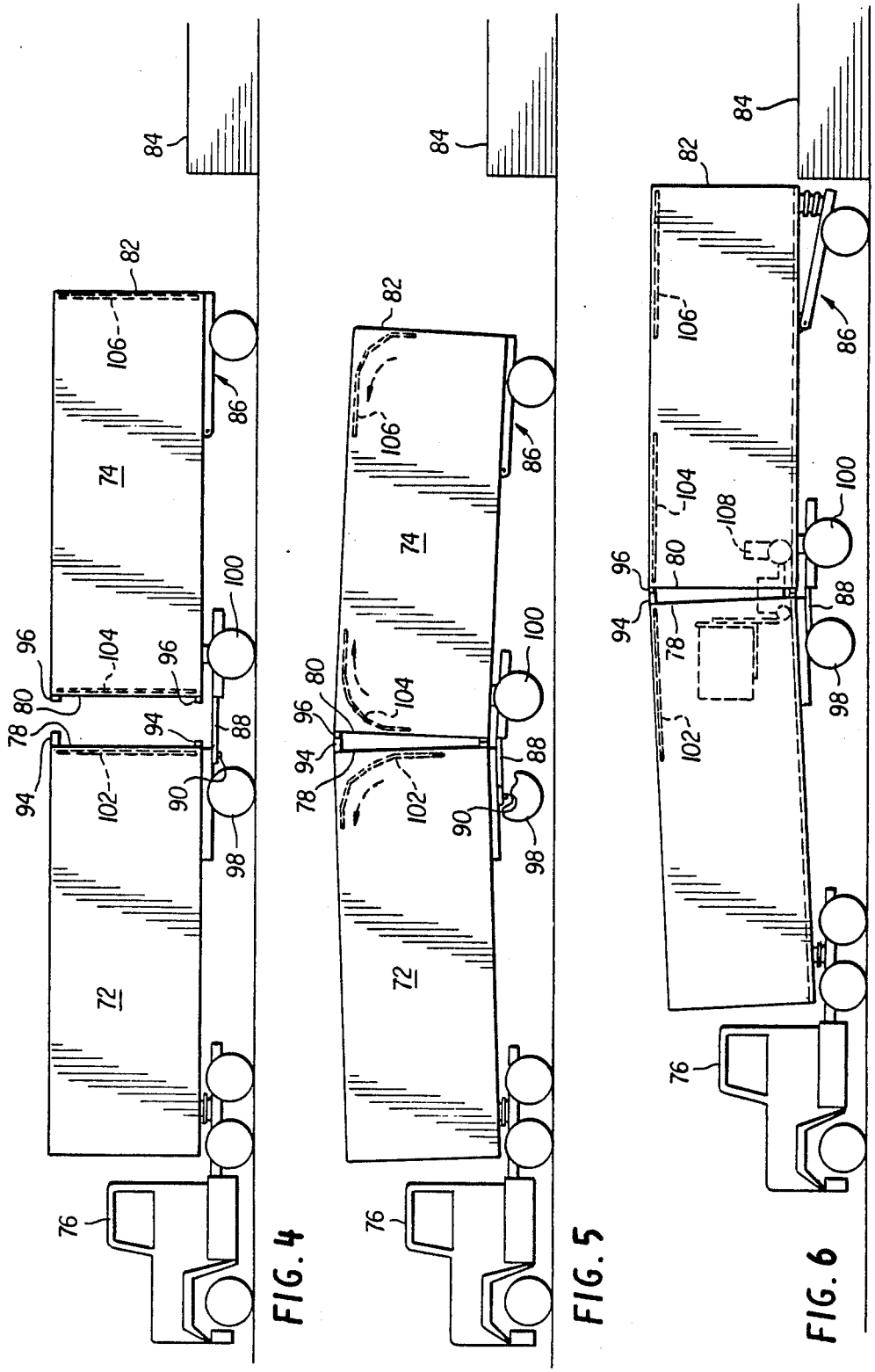

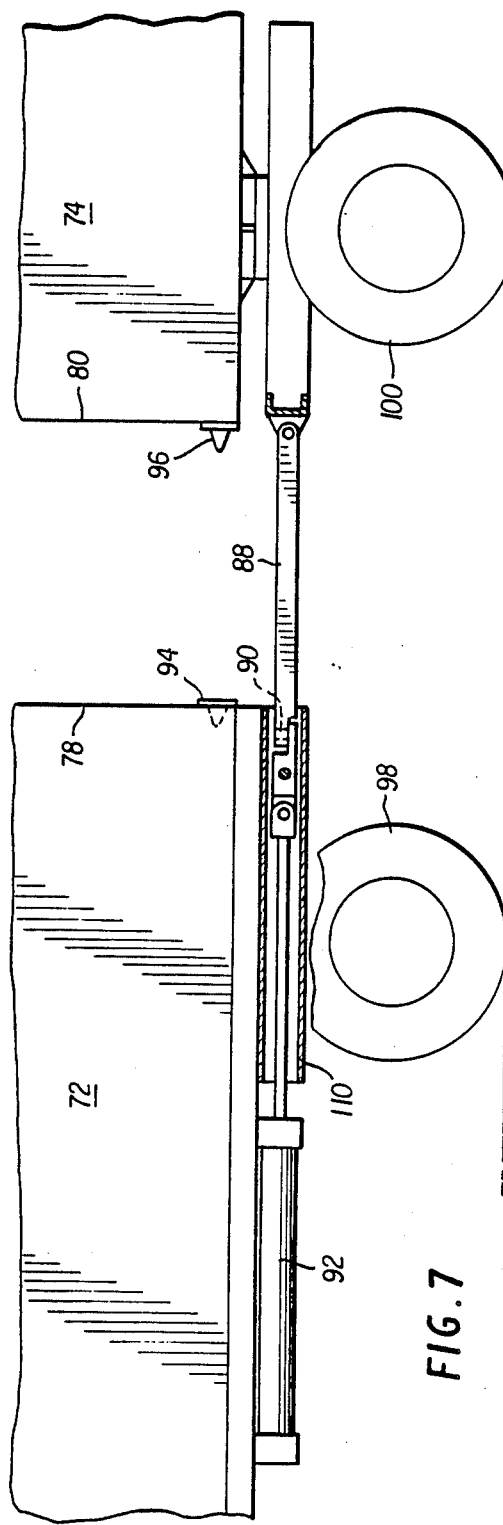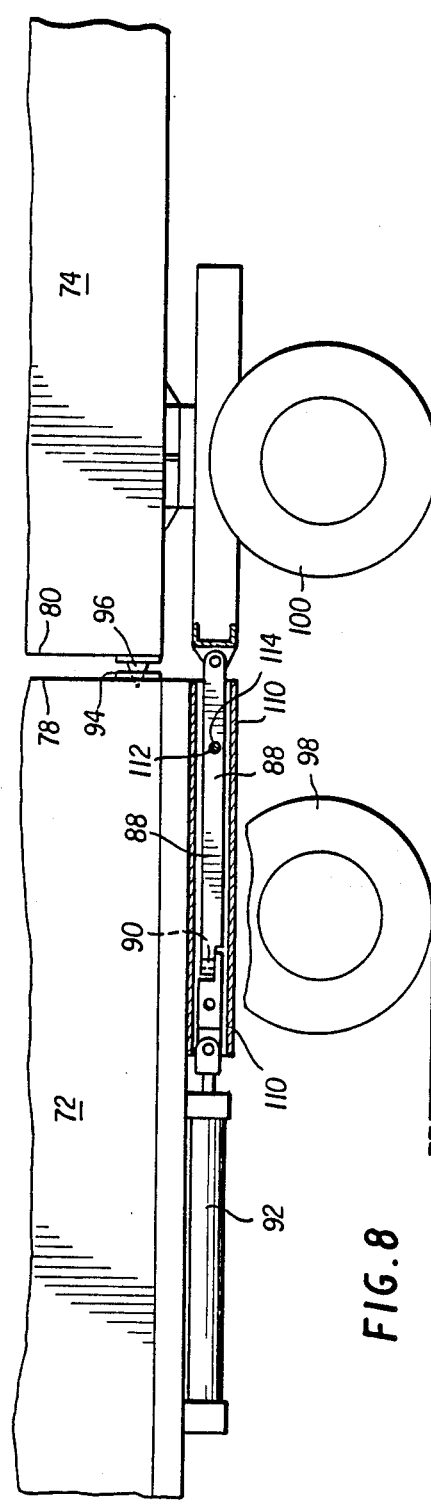

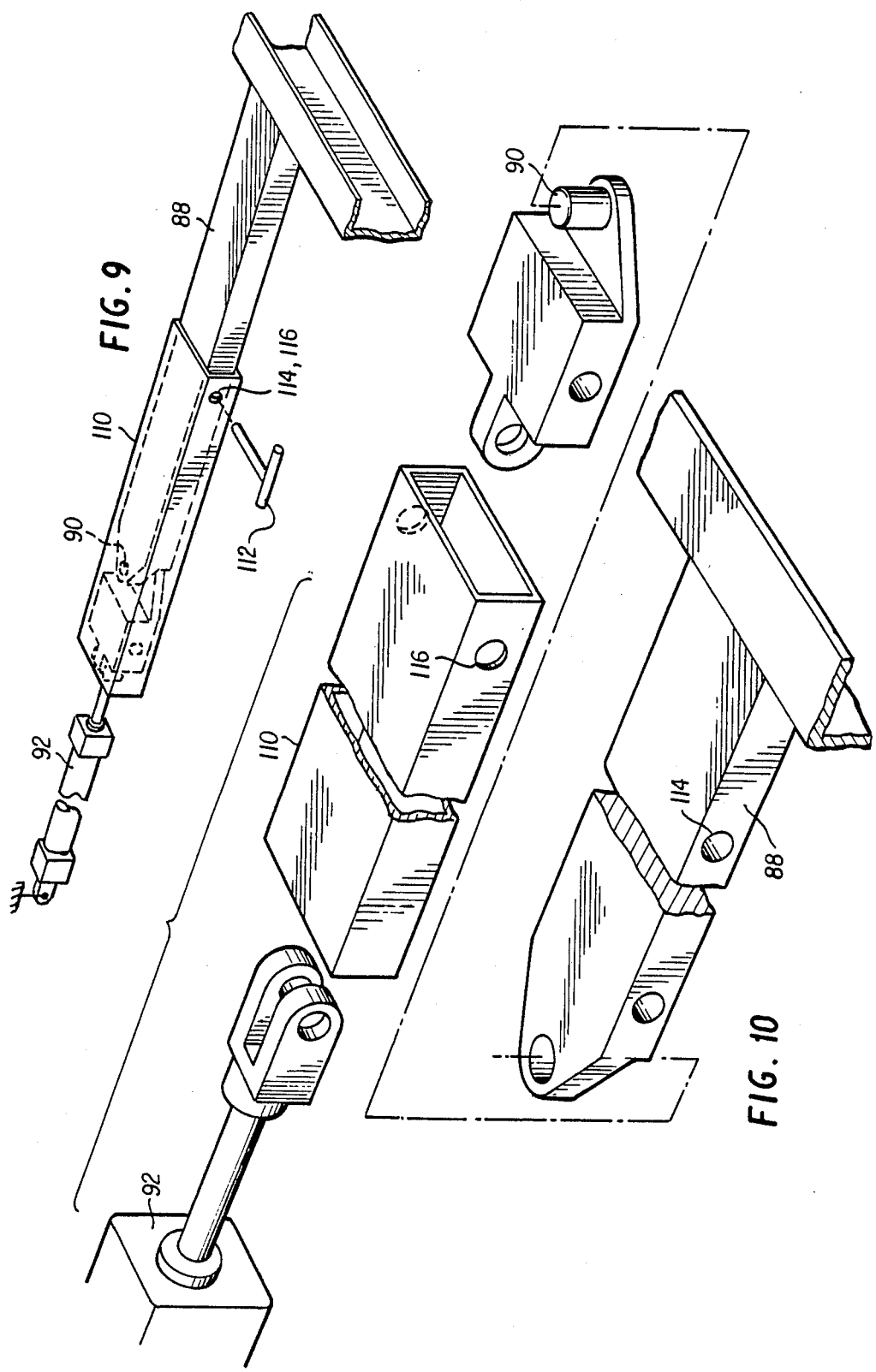

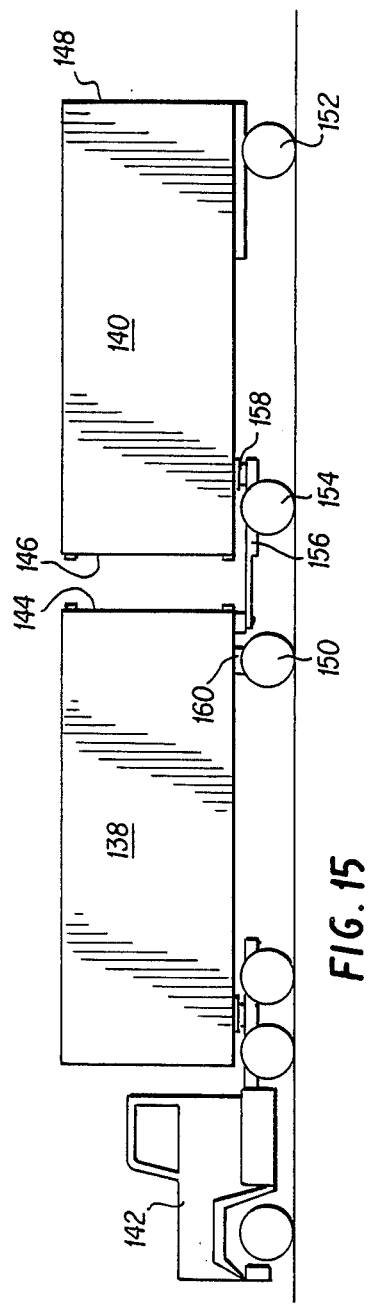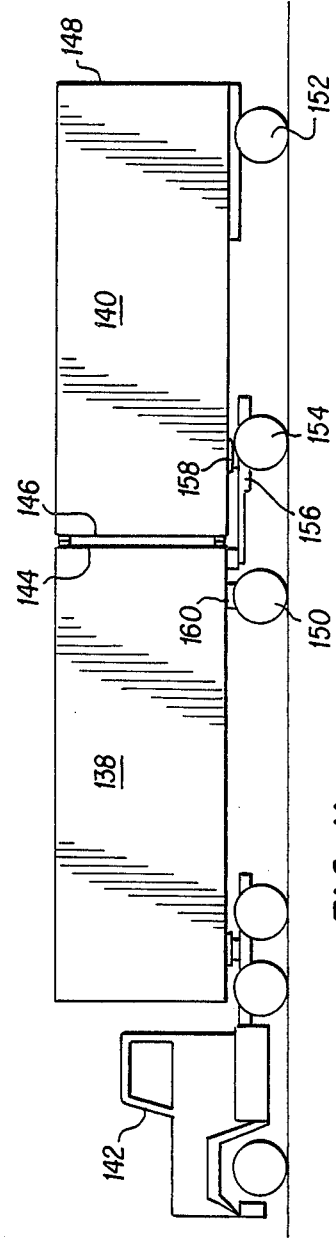

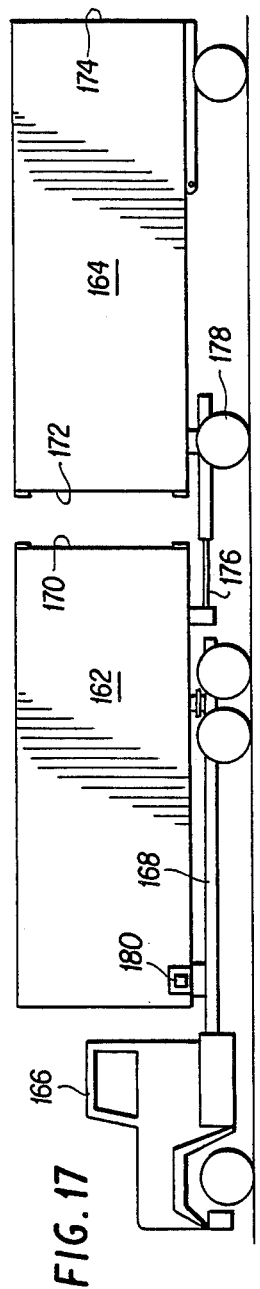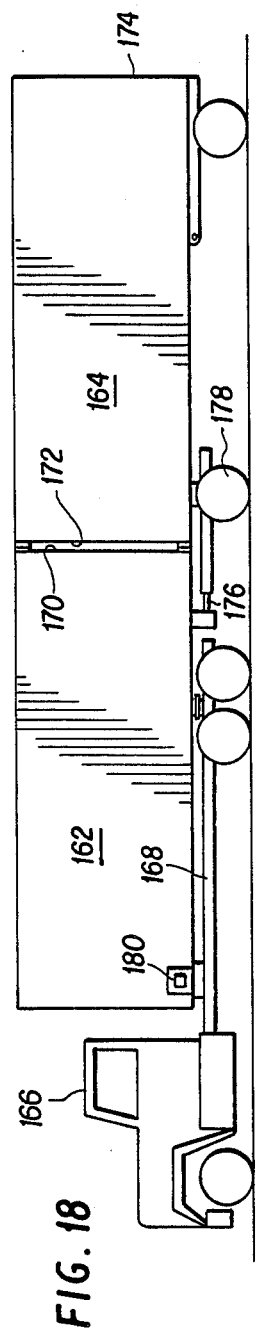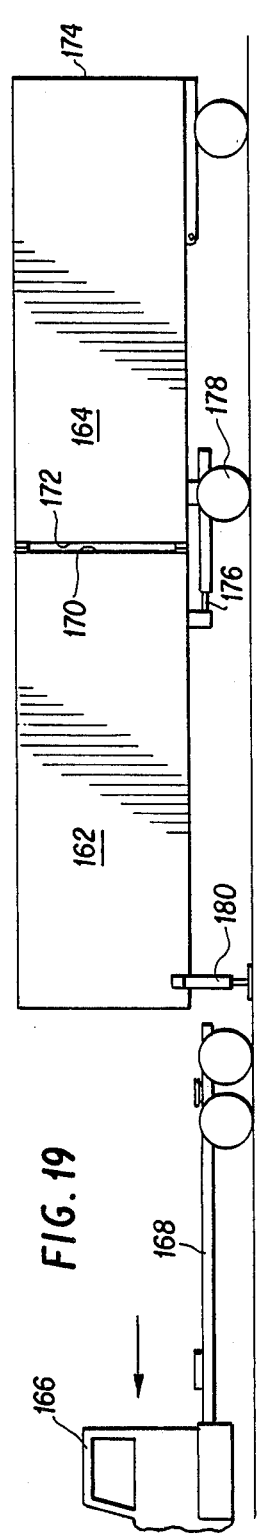

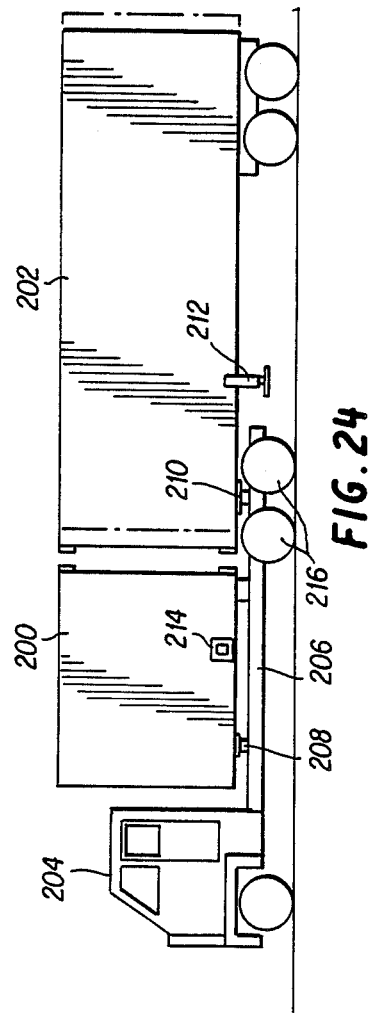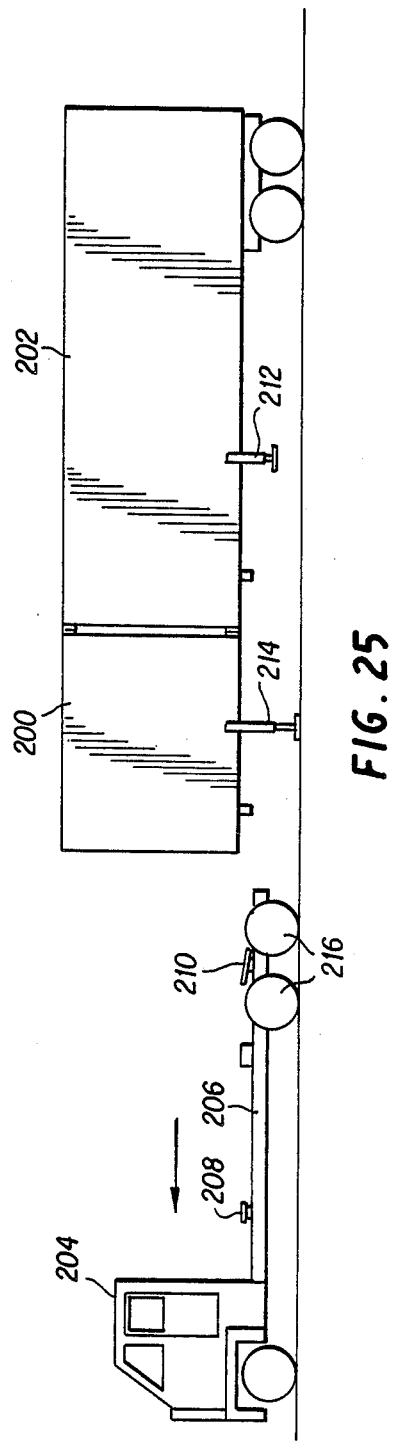

TRUCK SEMI-TRAILER AND FULL TRAILER COMBINATION IN WHICH THE SEMI-TRAILER AND THE FULL TRAILER CAN BE LOCKED TOGETHER FOR BACKING

FIELD OF THE INVENTION

This invention relates (1) to a truck semi-trailer and full trailer combination in which the semi-trailer and the full trailer can be locked together for backing and (2) to a long-wheelbase truck tractor with a detachable cargo carrying box and semi-trailer combination in which the two cargo-carrying vehicles can be locked together and maneuvered as a single semi-trailer for backing. In particular, it relates to such combinations which can be locked together to become a single unit for purpose of backing, handling, and loading.

BACKGROUND OF THE INVENTION

As is well known in the trucking industry, it is almost impossible to back a double-articulated unit such as a truck pulling both a semi-trailer and a full trailer. Accordingly, conventional practice is to uncouple the full trailer from the semi-trailer prior to backing and to back the two components of the units separately.

OBJECTS OF THE INVENTION

It is a principal object of the invention to provide a means whereby a double-articulated unit such as a tractor pulling both a semi-trailer and a full trailer can be locked together at the rear articulation for backing up.

It is another object of the invention to provide means whereby a long-wheelbase truck tractor with a removable cargo carrying box that can be detached from the tractor and that can be locked to a semi-trailer for loading, unloading, and maneuvering as a single semi-trailer unit.

It is still another object of the invention to provide means whereby the intermediate wheels of the double-articulated unit can be unweighted when the semitrailer and the full trailor are locked together for backing.

SUMMARY OF THE INVENTION

The subject invention accomplishes the first and second of the foregoing objects by providing means to lock the two cargo-carrying bodies together so that the two units can be loaded, unloaded, and backed together. It accomplishes the third of the foregoing objects by various means described hereinafter.

BRIEF DESCRIPTION OF THE DRAWINGS

FIG. 4 shows a tractor, a semi-trailer, and a full trailer in a normal, over-the-road condition in which the rear entrance opening of the full trailer is lower than the adjacent dock.

FIG. 5 shows the combination of FIG. 4 with the fourth and fifth axles drawn up off the ground, but the rear entrance opening of the full trailer is still lower than the adjacent dock.

FIG. 6 shows the combination of FIG. 4 with the rear entrance opening of the full trailer pivoted upwardly to the height of the adjacent dock.

FIG. 7 shows one embodiment of the articulation and locking means connecting a forward cargo body with a rearward cargo body in the normal, over-the-road condition.

FIG. 8 shows the structure of FIG. 7 in the locked condition.

FIG. 9 shows the details of one embodiment of the articulation and locking device shown in FIGS. 7 and 8.

FIG. 10 shows the structure of FIG. 9 in an exploded condition.

FIG. 15 shows a tractor, a semi-trailer, and a full trailer in a normal, over-the-road condition.

FIG. 16 shows the combination of FIG. 15 with the semi-trailer and the full trailer locked together.

FIG. 17 shows a tractor, a demountable body, and a full trailer in a normal, over-the-road condition.

FIG. 18 shows the combination of FIG. 17 with the demountable body and the full trailer locked together.

FIG. 19 shows the combination of FIG. 17 with the front legs on the demountable body down and the tractor driving away.

FIG. 24 shows a tractor, a demountable body, and semi-trailer in a normal, over-the-road condition.

FIG. 25 shows the combination of FIG. 24 with the demountable body and the semi-trailer locked together and the demountable body detached from the tractor.

DETAILED DESCRIPTION OF THE PRESENTLY PREFERRED EMBODIMENTS

Figure 1:
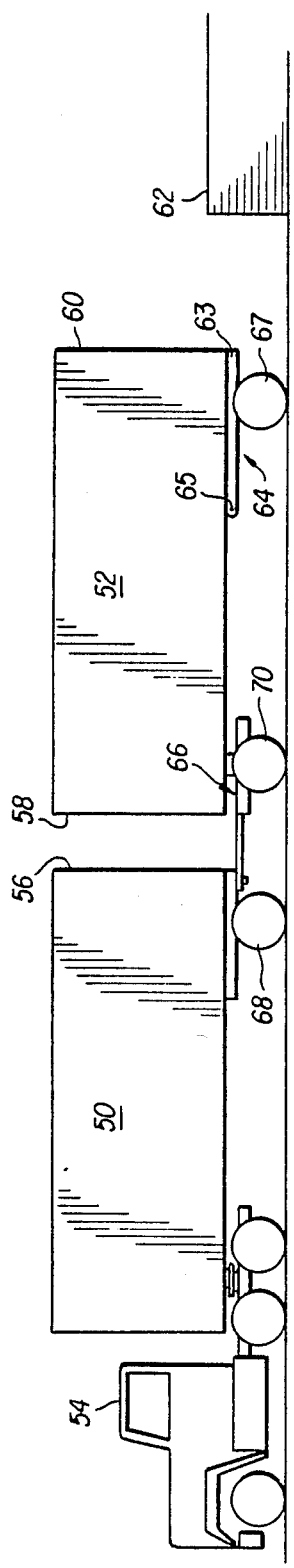
FIG. 1 shows a tractor, a semi-trailer, and a full trailer in a normal, over-the-road condition in which the rear entrance opening of the full trailer is lower than the adjacent dock.
Figure 2:
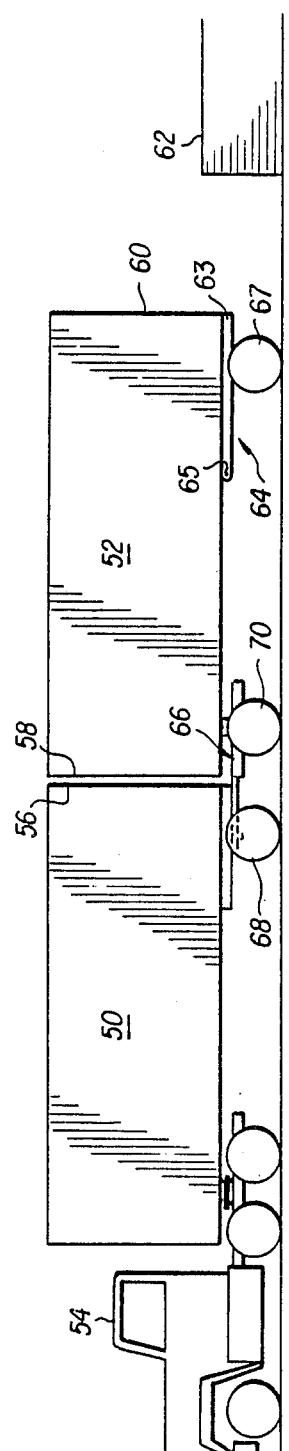
FIG. 2 shows the combination of FIG. 1 with the semi-trailer and the full trailer locked together, but the rear entrance opening of the full trailer is still lower than the adjacent dock.
Figure 3:
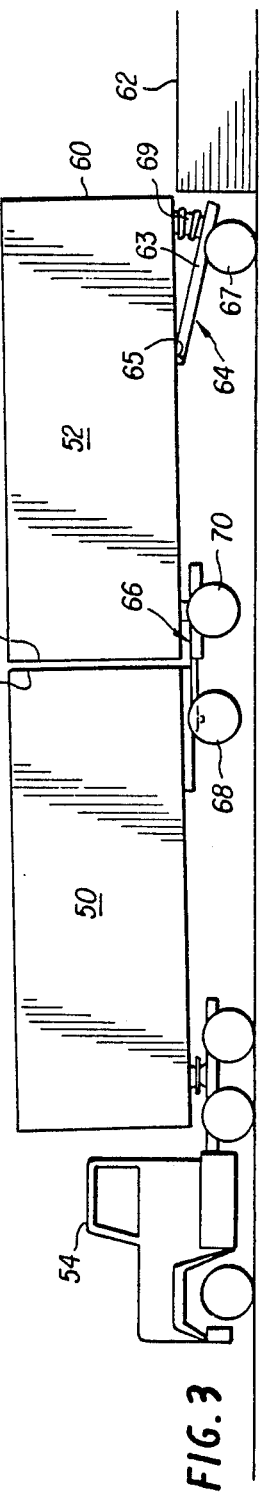
FIG. 3 shows the combination of FIG. 1 with the semi-trailer and the full trailer locked together and with the full trailer tilted upwardly so that its rear entrance opening is at the same height as the adjacent dock and so that the fourth and fifth axles are unweighted.

The Embodiment of FIGS. 1-3

A semi-trailer body 50 and a full trailer body 52 are both pulled by a tractor 54. The semi-trailer body 50 has a rear loading and unloading entrance 56, and the full trailer body 52 has a front loading and unloading entrance 58 and a rear loading and unloading entrance 60. The full trailer body 52 is shown adjacent to a dock 62 the level of which is higher than the normal, over-the-road level of the floor of the rear loading and unloading entrance 60. However, it is to be understood that the invention could also be used in the more conventional situation where the level of the dock is at least approximately equal to the over-the-road level of the floor of the rear loading and unloading entrance 60.

The full trailer body 52 has a pivoting assembly 64 comprising a pivoting frame 63 mounted on the underside of the full trailer body 52 for pivotal movement about an axis 65 that is transverse to the full trailer body 52 and this is spaced forwardly of the rear loading and unloading entrance 60. Rear wheels 67 are mounted on the pivoting frame 63.

Pivotal movement of the full trailer body 52 relative to the pivoting frame 63 is caused by inflation of a bellows 69 that is operatively positioned between the pivoting frame 63 and the full trailer body 52. The bellows 69 may, for instance, be of the type sold by Firestone Industrial Products Co. of Akron, Ohio under the trademark AIRSTROKE. Alternatively, the bellows 69 may be replaced by one or more hydraulic cylinders operatively positioned between the pivoting frame 63 and the full trailer body 52 or by any other convenient motivating mechanism.

The pivoting assembly 64 permits the rear end of the full trailer body 52 to be pivoted upward until the level of the floor of the rear loading and unloading entrance 60 comes up to the level of the dock 62 and the fourth and fifth axles are unweighted. Of course, other pivoting assemblies can be used to accomplish this result instead of the pivoting assembly 64.

A mechanism 66 (several embodiments of which are described in detail hereinafter) permits the semitrailer body 50 and the full trailer body 52 to be locked together (as shown in FIG. 2). When the semi-trailer body 50 and the full trailer body 52 are locked together, the two cargo-carrying bodies become, in effect, one long semi-trailer (i.e., the rear articulation is taken off line), and that one long semi-trailer can be maneuvered backwardly using the tractor 54 and the single forward articulation between the tractor 54 and the semi-trailer body 50. However, the central wheels (i.e., the rear ground engaging wheels 68 on the semitrailer body 50 and the front ground engaging wheels 70 on the full trailer body 52) somewhat impede the backing of the two linked cargo-carrying bodies. To obtain the full benefit of the invention, it is desirable to unweight the fourth and fifth axles (i.e., the axles carrying the rear ground engaging wheels 68 and the front ground engaging wheels 70, respectively) before the backing of the two locked cargo-carrying bodies is begun. This can be accomplished, for instance, by using the pivoting assembly 64 to lift the wheels 68 and 70 off the ground.

With the semi-trailer body 50 linked to the full trailer body 52, the two locked cargo-carrying bodies can be backed into a loading or unloading position in which the rear loading and unloading entrance 60 of the full trailer body 52 is adjacent to the dock 62, and the pivoting assembly 64 can be used to adjust the height of the floor of the rear loading and unloading entrance 60 to that of the dock 62. As will be readily perceived, if the height of the dock 62 is the same as the height of the floor of the rear loading and unloading entrance 60 in the normal, over-the-road condition of the full trailer 52, the pivoting assembly 64 can be actuated in one direction to unweight the wheels 68 and 70 for backing, then actuated in the other direction to drop the rear unloading entrance 60 back down to the level of loading and the dock 62.

While it is possible to load and unload the semi-trailer 50 and the full trailer body 52 separately, to obtain the full benefit of the invention it is desirable to provide doors on the rear loading and unloading entrance 56 of the semi-trailer body 50 and the front loading and unloading entrance 58 of the full trailer body 52 which open and close as a unit, permitting fork lift trucks and wheeled dollies to have access from the dock 62 to the combined floor space of the semi-trailer body 50 and the full trailer body 52. One such arrangement will be described in detail hereinafter.

The Embodiment of FIGS. 4–10

A semi-trailer body 72 and a full trailer body 74 are both pulled by a tractor 76. The semi-trailer body 72 has a rear loading and unloading entrance 78, and the full trailer body 74 has a front loading and unloading entrance 80 and a rear loading and unloading entrance 82. The full trailer body 74 is shown adjacent a dock 84 the level of which is higher than the normal, over-the-road level of the floor of the gear loading and unloading entrance 82. However, the full trailer body 74 has a pivoting assembly 86 of the type previously described with reference to the embodiment of FIGS. 1–3 that permits the full trailer body 74 to be pivoted until the level of the floor of the rear loading and unloading entrance 82 comes up to the level of the dock 84. Of course, other pivoting assemblies can be used instead of the pivoting assembly 86.

The semi-trailer body 72 is hooked to the full trailer body 74 by means of a tow bar 88. The tow bar 88 is attached to a pin 90 which is at the rear of the semi-trailer body 72 when the vehicle is its normal, over-the-road condition (shown in FIGS. 4 and 7). The pin 90 is movable from its normal, over-the-road position to a backing position (shown in FIGS. 5, 6, and 8) by means of a fluid jack 92 mounted on the bottom of the semi-trailer body 72.

If desired, the fluid jack 92 can be designed to provide three spacings between the semi-trailer body 72 and the full trailer body 74: a minimum spacing in which the two bodies 72 and 74 are locked together to form one rigid semi-trailer body, a maximum spacing permitting the two bodies to be pivoted nearly perpendicular to each other (as they sometimes are in loading and unloading yards), and an intermediate spacing for over-the-road use, during which the two bodies need only pivot 30° or so relative to each other. As will be readily appreciated, this feature permits a maximum percentage of the overall length permitted by law in over-the-road use to be devoted to cargo space.

The semi-trailer body 72 is fitted with bearing blocks 94 on its rearward four corners. The full trailer body 74 is fitted with mating bearing blocks 96 on its forward four corners. When the two cargo-carrying bodies are in their normal, over-the-road positions, the upper bearing blocks on the two cargo-carrying bodies are closer together than the lower bearing blocks. (This may be clearly seen in FIG. 4.) Accordingly, when the two cargo-carrying bodies are pulled together by actuation of the fluid jack 92 until all four pairs of bearing blocks mate, the rear wheels 98 on the semi-trailer body 72 and the forward wheels 100 on the full trailer body 74 are forced up off the ground as illustrated in FIGS. 5, 6, and 8. When the semi-trailer body 72 and the full trailer body 74 are locked together in this fashion, the two cargo-carrying bodies become, in effect, one long semi-trailer (i.e., the rearward articulation is taken off line), and that one long semi-trailer can be maneuvered backwardly using the tractor 76 and the single forward articulation between the tractor 76 and the semi-trailer body 72.

FIG. 6 shows the pivoting assembly 86 being used to lift the floor of the rear loading and unloading entrance 82 to the level of a dock 84 which is higher than the normal, over-the-road level of the rear loading and unloading entrance 82. However, as will be readily appreciated, if the normal, over-the-road level of the rear loading and unloading entrance 82 is the same as the height of the dock 84, the pivoting assembly 86 need not be used for this purpose. Consequently, another means of lifting the middle wheels is needed. This can be accomplished, inter alia, (1) by drawing the two units together against bearing blocks that create the angle between the two units as shown in FIG. 5 and FIG. 6, (2) by lifting the intermediate axles in a fashion such as is shown in FIG. 11 and FIG. 12, or (3) by releasing the pressure on the middle wheels in the manner described with reference to FIGS. 15 and 16.

FIGS. 4–6 show (in highly diagrammatic form) a rear vertically moveable door 102 which closes the rear loading and unloading entrance 78 when the semi-trailer body 72 is in its normal, over-the-road condition, a forward vertically moveable door 104 which closes the forward loading and unloading entrance 80 when the full trailer body 74 is in its normal, over-the-road condition, and a rear vertically moveable door 106 which closes the rear loading and unloading entrance 82 when the full trailer body 74 is in its normal, over-the-road condition. The doors 102, 104, and 106 may be, for instance, any of the roller-doors that are well known in the art. Alternatively, the doors 102 and 104 can pivot in the same direction (about either horizontal or vertical axes), and each door can be either a unitary door or a pair of doors pivoting in opposite directions (about either horizontal or vertical axes), resulting in one door (or pair of doors) fitting against the other door (or pair of doors) when the two doors are open. Preferably, the drives for the doors 102 and 104 are operatively connected to each other so that the two doors open and close at the same time, permitting a wheeled dolly or the illustrated fork lift truck 108 to have access to the interior of the two cargo-carrying bodies.

Instead of using the fluid jack 92 to pull the tow bar 88 forwardly into a housing 110 mounted under the forward cargo-carrying body (as shown in FIGS. 7, 8, and 9), it is also possible to provide a housing mounted under the rearward cargo-carrying body and to lock the two cargo-carrying bodies together by setting of the rearward cargo-carrying, then backing the forward cargo-carrying body toward the rearward cargo-carrying body so that the tow bar 88 telescopes into the housing on the rear cargo-carrying body. In either case, a cotter pin 112 and corresponding through holes 114, 116 in the tow bar 88 and the housing 110, respectively, can be usd to lock the tow bar 88 into position inside the housing. Of course, if the three-position variant described above is used, an additional set of through holes must be provided to define the intermediate, or over-the-road, position of the two cargo-carrying bodies.

Figures 11, 12:
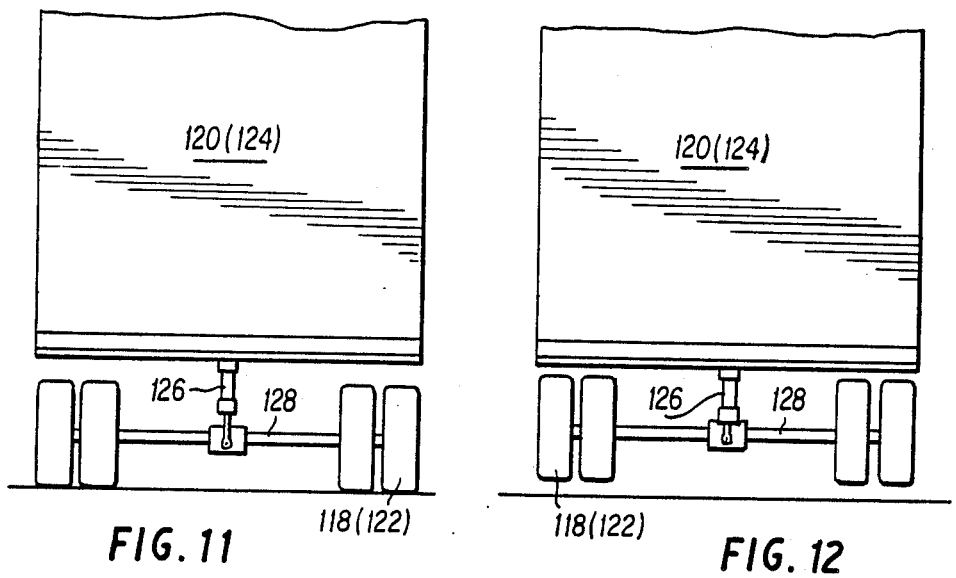
FIG. 11 shows an embodiment of structure for raising and lowering the ground engaging wheels adjacent the rear articulation in the ground engaging position.
FIG. 12 shows the structure of FIG. 11 with the wheels off the ground.

The Embodiment of FIGS. 11 and 12

FIGS. 11 and 12 illustrate in diagrammatic form an alternative means for raising or simply unweighting the pair of rear ground-engaging wheels 118 on the forward cargo-carrying body 120 (which can be either a semi-trailer or a long-wheelbase cargo-carrying truck—i.e., a truck in which the tractor and the cargo-carrying body are integral or are demountably connected to one another) and the pair of forward ground-engaging wheels 122 on the rearward cargo-carrying body 124 off the ground when the forward cargo-carrying body 120 and the rearward cargo-carrying body 124 are locked together. In this embodiment, the pairs of ground-engaging wheels 118, 122 are each mounted on the associated one of the cargo-carrying bodies 120, 124 by means of a fluid jack 126 one end of which is connected to an axle 128 and one end of which is connected to the associated one of the cargo-carrying bodies 120, 124. Thus, when the forward and rearward cargo-carrying 120, 124 are in their normal, over-the-road relationship, the fluid jacks 126 are extended and the ground-engaging wheels 118, 122 engage the ground. Correspondingly, when the forward and rearward cargo-carrying bodies 120, 124 are locked together, the fluid jacks 126 are actuated to draw the ground-engaging wheels 118, 122 out of contact with the ground.

Figure 13:
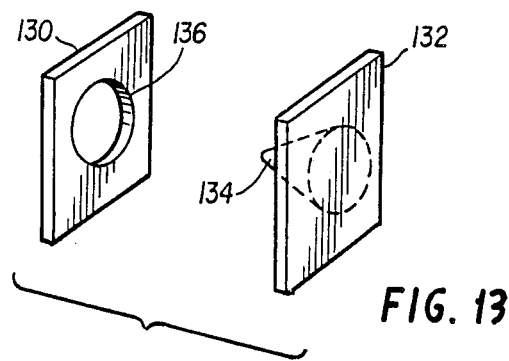
FIG. 13 shows one embodiment of engaging bearing blocks useable with this invention.
Figure 14:
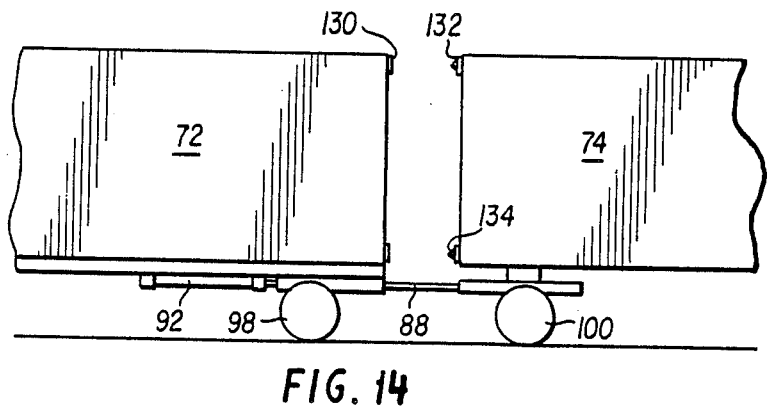
FIG. 14 illustrates the mounting of the bearing blocks shown in FIG. 13.

The Embodiment of FIGS. 13 and 14

FIGS. 13 and 14 illustrate in diagramatic form a typical self-centering corner bearing plate assembly comprising a female plate 130 and a male plate 132 having a conical projection 134 sized, shaped, and positioned to be received in a hole 136 in the female plate 130.

EMBODIMENT OF FIGS. 15 and 16

A semi-trailer body 138 and a full trailer body 140 are both pulled by a tractor 142. The semi-trailer body 138 has a rear loading and unloading entrance 144, and the full trailer body 140 has a front loading and unloading entrance 146 and a rear loading and unloading entrance 148. The semi-trailer body 138 has rear wheels 150. The full trailer body 140 has rear wheels 152 and front wheels 154 mounted on a dolly 156. A fifth wheel 158 is slideably mounted on the upper surface of the dolly 156.

In the normal, over-the-road position of the full trailer body 140 shown in FIG. 15, the dolly 156 is pivotally connected to the back of the semi-trailer body 138 in the conventional manner, and the fifth wheel 158 is locked in position on the upper surface of the dolly 156. However, the fifth wheel 158 can be unlocked and slid relative to the upper surface of the dolly 156 by an appropriate means—such as a fluid jack, for example. Thus, the fifth wheel 158 and the full trailer body 140 can be moved forward relative to the dolly 156 until the full trailer body 140 reaches the position shown in FIG. 16. In this position, the semi-trailer body 138 and the full trailer body 140 can be locked together by any of the locking means previously described or any other appropriate locking means.

The embodiment of FIGS. 15 and 16 does not include a pivoting assembly such as has been described with reference to the other embodiments. Instead, the wheels 150 and 154 are mounted on pneumatic springs 160 that can be deflated, resulting in the wheels 150 and 154 being taken off line. In that condition, the wheels 150 and 154 will still touch the ground, but they will not bear any weight. Thus, when the unit is backed up, the wheels 150 and 154 will "scuff" the ground, but they will permit the semi-trailer 138 and the full trailer 140 to be backed as a unit. Of course, this method of taking the intermediate wheels off line can also be used with any of the other embodiments described herein.

The Embodiment of FIGS. 17-21

A demountable body 162 and a full trailer body 164 are both pulled, during over-the-road movement, by a tractor 166 having an elongated frame 168. The demountable body 162 has a rear loading and unloading entrance 170, and the full trailer body 164 has a front loading and unloading entrance 172 and a rear loading and unloading entrance 174.

The demountable body 162 is hooked to the full trailer body 164 by means of a tow bar 176. The tow bar 176 can be of the same two- or three-position design described above with reference to the embodiment of FIGS. 4-10.

The demountable body 162 and the full trailer body 164 can be locked together for simultaneously loading and unloading by any of the locking means described previously. Additionally, the full trailer body 164 has front ground engaging wheels 178, and the front ground engaging wheels 178 can be unweighted during maneuvering when the demountable body 162 is locked to the full trailer body 164 by any of the means described above.

Figure 20:
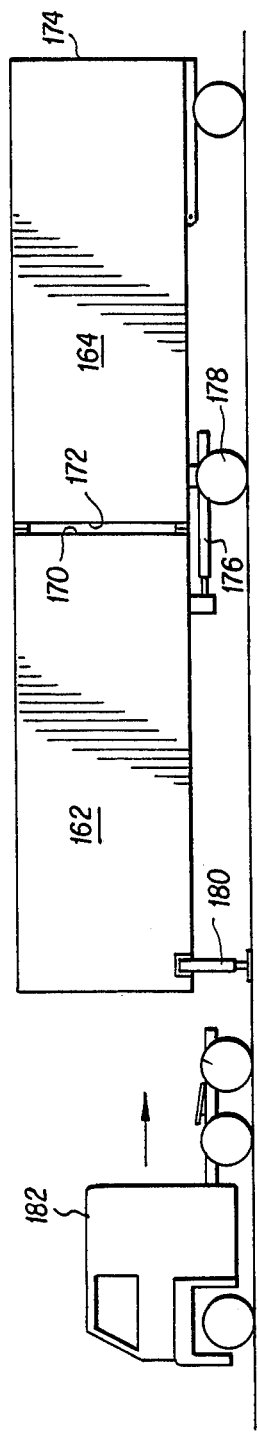
FIG. 20 shows the combination of FIGS. 17 with the front legs on the demountable body down and a yard tractor backing into position.
Figure 21:
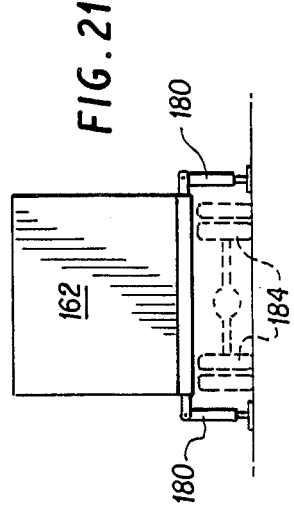
FIG. 21 is a front view of the demountable body shown in FIGS. 17–20 with the front legs down.

The embodiment of FIGS. 17-21 differs from the embodiments described above chiefly in the provision of front legs 180 on the demountable body 162. As shown in FIG. 19, the front legs 180 can be dropped, the tractor 166 having the elongated frame 168 driven away, and, as shown in FIG. 20, a conventional yard tractor 182 used to maneuver the demountable body 162 and the full trailer body 164 as a single giant semi-trailer in the yard. Of course, as shown in FIG. 21, the actuated position of the front legs 180 must be outboard of the tires 184 of both the tractor 166 and the yard tractor 182.

Figure 22:
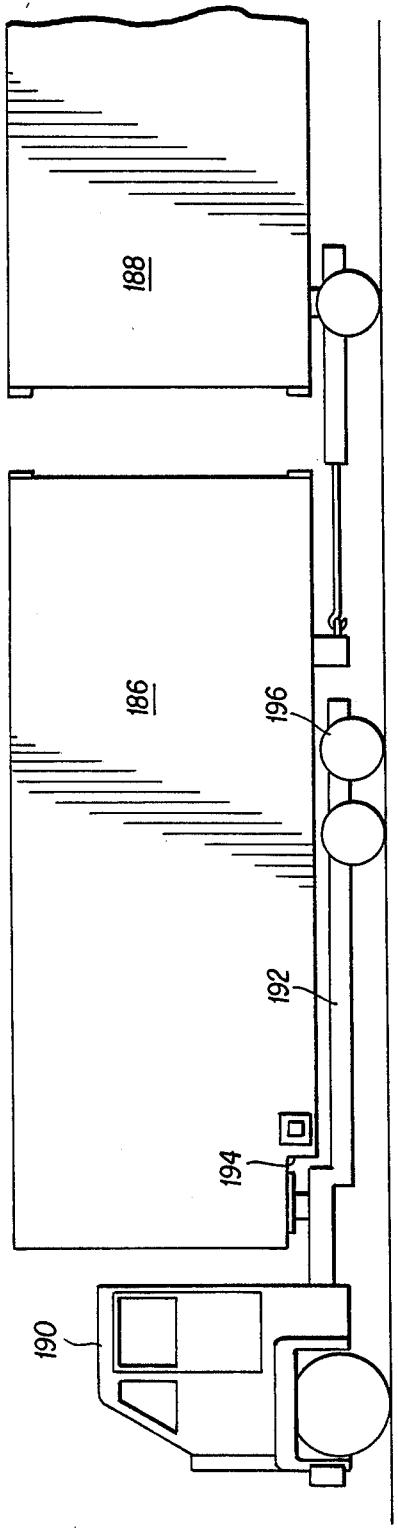
FIG. 22 shows a tractor with a Z-frame, a demountable body, and a full trailer in a normal, over-the-road condition.
Figure 23:
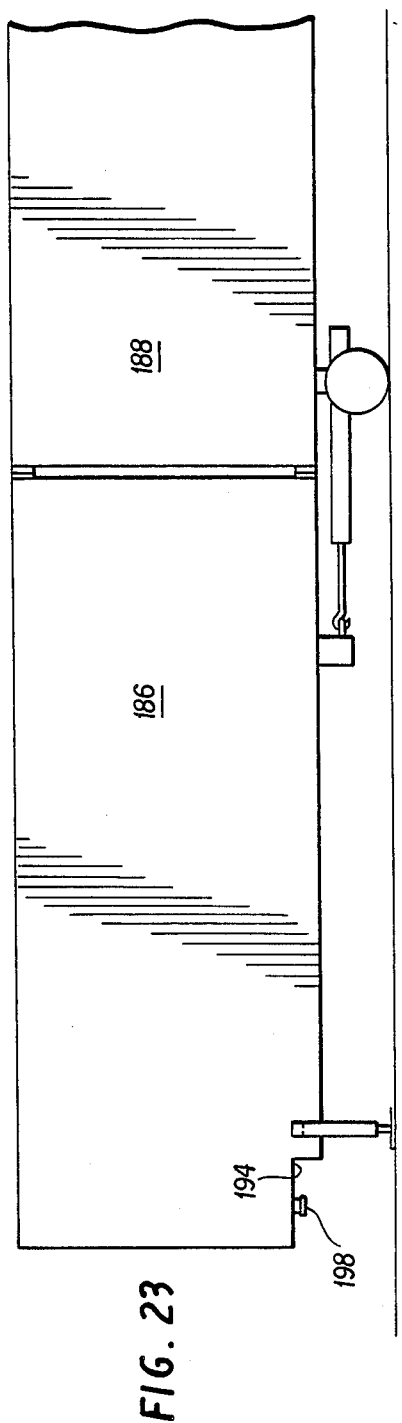
FIG. 23 shows the demountable body and the full trailer of FIG. 22 locked together.

The Embodiment of FIGS. 22-23

The embodiment of FIGS. 22 and 23 is identical to the embodiment of FIGS. 17-20 except that a demountable body 186 and a full trailer body 188 both are unusually low slung to increase their carrying volumes. To accommodate this, a tractor 190 has Z-frame 192, and the demountable body 186 has a step (or notch) 194 designed for two purposes: (1) to provide clearance for a drive shaft or transmission leading to rear ground-engaging wheels 196 on the Z-frame 192 and (2) to provide a normal height king pin 198 on the demountable body 186 so that ordinary yard tractors can move the loaded demountable body 186 and the full trailer body 188.

Figure 26:
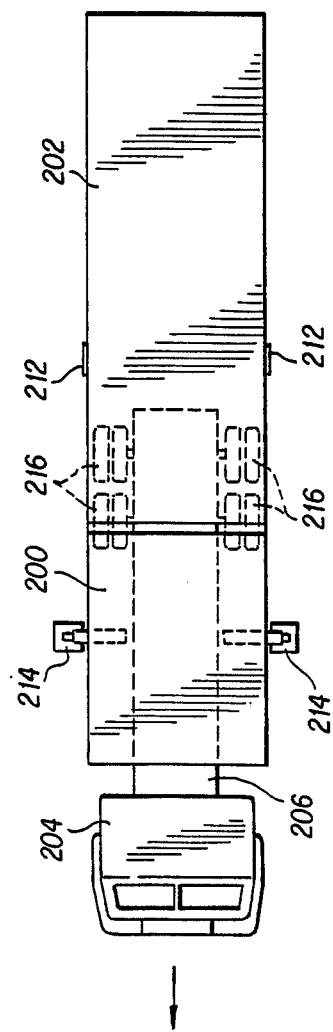
FIG. 26 is a top view of the combination of FIG. 24.

The Embodiment of FIGS. 24-26

A demountable body 200 and a semi-trailer body 202 are both pulled by a tractor 204 having an elongated frame 206. On the elongated frame 206 are mounted a locking device 208 such as a pin-and-clevis which engages the demountable body 200 and a sliding fifth wheel 210 which engages the semi-trailer body 202. The sliding fifth wheel 210 is slideable into three positions: a normal, over-the-road position shown in solid line in FIG. 24 in which the rear end of the demountable body 200 and the front end of the semi-trailer body 202 are relatively closely spaced, a yard-maneuvering position shown in broken line in FIG. 24 in which the rear end of the demountable body 200 and the front end of the semi-trailer body 202 are spaced relatively far apart to permit articulation of the two bodies by an angle at least approaching 90°, and a position in which the demountable body 200 and the semi-trailer body 202 can be locked together as shown in FIG. 25.

The demountable body 200 and the semi-trailer body 202 can be locked together as shown FIG. 25 by any of the locking mechanisms previously described.

The semi-trailer body 202 has normal front legs 212. In addition, the demountable body 200 has legs 214 that support the weight of the demountable body 200 when the demountable body 200 and the semi-trailer body 202 are locked together and the demountable body 200 is detached from the tractor 204 as shown in FIG. 25. The two cargo-carrying bodies can be stored in this fashion pending reuse or maneuvering by a yard tractor.

As shown in FIG. 26, the legs 214 are preferably hinged or telescoped to the demountable body 200 so as to permit them to move outwardly of the demountable body 200 to a distance that permits the rear wheels 216 on the elongated frame 206 to pass between them without touching them when the tractor 204 is driven away from the remainder of the vehicle.

Caveat

While a number of preferred embodiments of the subject invention have been described in detail, it will be readily appreciated by those of ordinary skill in the art that numerous other embodiments of the invention can be designed. Accordingly, the subject invention must be interpreted with reference to the claims appended hereto and not merely with reference to the preferred embodiments described herein.

What is claimed as new and desired to be secured by Letters Patent of the United States is:

1. A cargo-carrying vehicle comprising:
   (a) a forward cargo-carrying body, said forward cargo-carrying body having at least one pair of rear ground-engaging wheels;
   (b) a rearward cargo-carrying body, said rearward cargo-carrying body having at least one pair of forward ground-engaging wheels; and
   (c) first means for locking said forward cargo-carrying body and said rearward cargo-carrying body together so that said forward and rearward cargo-carrying bodies can be backed as one unit, said first means comprising:
      (i) a tow bar which, when said forward and rearward cargo-carrying bodies are in their normal, over-the-road relationship, spaces said cargo-carrying bodies and permits said rearward cargo-carrying body to articulate relative to said forward cargo-carrying body;
      (ii) a housing sized, shaped, and positioned to receive said tow bar telescopically when said forward and rearward cargo-carrying bodies are locked together;
      (iii) four bearing blocks mounted on the four corners of one of said cargo-carrying bodies facing the other one of said cargo-carrying bodies; and
      (iv) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together, the ones of said bearing blocks mounted on the upper corners of said forward and rearward cargo-carrying bodies being closer to each other than are the ones of said bearing blocks mounted on the lower corners of said forward and rearward cargo-carrying bodies when said forward and rearward cargo-carrying bodies are in their normal, over-the-road relationship, whereby, when said forward and rearward cargo-carrying bodies are locked together by said first means, said at least one pair of rear ground-engaging wheels on said forward cargo-carrying body and said at least one pair of forward ground-engaging wheels on said rearward cargo-carrying body are drawn upwardly out of contact with the ground.

2. A cargo-carrying vehicle as recited in claim 1 wherein:
   (a) said forward cargo-carrying body is a semitrailer body and
   (b) said rearward cargo-carrying body is a full trailer body.

3. A cargo-carrying vehicle as recited in claim 1 wherein said forward cargo-carrying body is a long-wheelbase tractor with a demountable cargo-carrying body.

4. A cargo-carrying vehicle as recited on claim 3 wherein said rearward cargo-carrying body is a full trailer body.

5. A cargo-carrying vehicle as recited in claim 3 wherein said rearward cargo-carrying body in a semi-trailer body.

6. A cargo-carrying vehicle as recited in claim 1 and further comprising second means for pulling said tow bar into said housing.

7. A cargo-carrying vehicle as recited in claim 6 wherein said second means comprise a fluid jack mounted on one of said forward and rearward cargo-carrying bodies.

8. A cargo-carrying vehicle as recited in claim 1 wherein said rearward cargo-carrying body has at least one pair of rear ground-engaging wheels and a rear loadiang and unloading entrance.

9. A cargo-carrying vehicle as recited in claim 1 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

10. A cargo-carrying vehicle as recited in claim 1 wherein:
    (a) said forward cargo-carrying body has a rear loading and unloading entrance;
    (b) said rearward cargo-carrying body has a forward loading and unloading entrance; and
    (c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

11. A cargo-carrying vehicle as recited in claim 1 wherein:
    (a) said forward cargo-carrying body is a demountable cargo-carrying body detachably mounted on the frame of a long-wheelbase tractor;
    (b) a locking device is mounted on said frame in position to engage said demountable cargo-carrying body;
    (c) said rearward cargo-carrying body is a semi-trailer body; and
    (d) a fifth wheel is mounted on said frame in position to engage said rearward cargo-carrying body.

12. A cargo-carrying vehicle as recited in claim 11 wherein said fifth wheel is slidable relative to said frame for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

13. A cargo-carrying vehicle as recited in claim 11 and further comprising:
    (a) a first pair of legs mounted on said semi-trailer body and
    (b) a second pair of legs mounted on said demountable cargo-carrying body.

14. A cargo-carrying vehicle as recited in claim 13 wherein said second pair of legs is mounted on said demountable cargo-carrying body so as to permit said second pair of legs to be hinged or telescoped away from the center of said demountable cargo-carrying body to a distance that permits said long-wheelbase tractor's rear wheels to pass, thus enabling said rear wheels to clear.

15. A cargo-carrying vehicle comprising:
    (a) a forward cargo-carrying body, said forward cargo-carrying body having at least one pair of rear ground-engaging wheels;
    (b) a rearward cargo-carrying body, said rearward cargo-carrying body having at least one pair of forward ground-engaging wheels;
    (c) first means for locking said forward cargo-carrying body and said rearward cargo-carrying together so that said forward and rearward cargo-carrying bodies can be backed as one unit;
    (d) a pivoting frame mounted on the under side of said rearward cargo-carrying vehicle for pivotal movement about an axis that is transverse to said rearward cargo-carrying body and that is spaced forwardly of said rear loading and unloading entrance on said rearward cargo-carrying body;
    (e) at least one pair of ground-engaging wheels mounted on said pivoting frame; and
    (f) third means for pivoting said rearward cargo-carrying body about said axis such that said at least one pair of forward ground-engaging wheels on said rearward cargo-carrying body and said at least one pair of rear ground-engaging wheels on said forward cargo-carrying body are taken off line.

16. A cargo-carrying vehicle as receited in claim 15 wherein:
    (a) said forward cargo-carrying body is a semitrailer body and
    (b) said rearward cargo-carrying body is a full trailer body.

17. A cargo-carrying vehicle as recited in claim 15 wherein said forward cargo-carrying body is a long-wheelbase tractor with a demountable cargo-carrying body.

18. A cargo-carrying vehicle as recited on claim 17 wherein said rearward cargo-carrying body is a full trailer body.

19. A cargo-carrying vehicle as recited in claim 17 wherein said rearward cargo-carrying body in a semi-trailer body.

20. A cargo-carrying vehicle as recited in claim 15 wherein said first means comprise:
   (a) a tow bar which, when said forward and rearward cargo-carrying bodies are in their normal, over-the-road relationship, spaces said cargo-carrying bodies and permits said rearward cargo-carrying body to articulate relative to said forward cargo-carrying body;
   (b) a housing sized, shaped, and positioned to receive said tow bar telescopically when said forward and rearward cargo-carrying bodies are locked together;
   (c) four bearing blocks mounted on the four corners of one of said cargo-carrying bodies facing the other one of said cargo-carrying bodies; and
   (d) four bearing blocks mounted on the four corners of said other one of said cargo-carrying bodies facing said one of said cargo-carrying bodies, and bearing blocks on said two cargo-carrying bodies being sized, shaped, and positioned to mate with each other to lock said cargo-carrying bodies together.

21. A cargo-carrying vehicle as recited in claim 20 and further comprising second means for pulling said tow bar into said housing.

22. A cargo-carrying vehicle as recited in claim 21 wherein said second means comprise a fluid jack mounted on one of said forward and rearward cargo-carrying bodies.

23. A cargo-carrying vehicle as recited in claim 15 wherein said third means apply a force to said pivoting frame and a corresponding force to said rearward cargo-carrying body to cause said pivoting frame and said rearward cargo-carrying body to pivot relative to each other about said axis.

24. A cargo-carrying vehicle as recited in claim 23 wherein said third means comprise fluid operated bellows mounted between said pivoting frame and said rearward cargo-carrying body and spaced from said axis.

25. A cargo-carrying vehicle as recited in claim 15 wherein said first means comprise:
   (a) a dolly on which said at least one pair of forward ground-engaging wheels on said rear cargo-carrying body is mounted and
   (b) a fifth wheel slidably mounted on the upper surface of said dolly.

26. A cargo-carrying vehicle as recited in claim 15 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

27. A cargo-carrying vehicle as recited in claim 15 wherein:
   (a) said forward cargo-carrying body has a rear loading and unloading entrance;
   (b) said rearward cargo-carrying body has a forward loading and unloading entrance; and
   (c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

28. A cargo-carrying vehicle as recited in claim 15 wherein:
   (a) said forward cargo-carrying body is a demountable cargo-carrying body detachably mounted on the frame of a long-wheelbase tractor;
   (b) a locking device is mounted on said frame in position to engage said demountable cargo-carrying body;
   (c) said rearward cargo-carrying body is a semi-trailer body; and
   (d) a fifth wheel is mounted on said frame in position to engage said rearward cargo-carrying body.

29. a cargo-carrying vehicle as recited in claim 28 wherein said fifth wheel is slideable relative to said frame for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

30. A cargo-carrying vehicle as recited in claim 28 and further comprising:
   (a) a first pair of legs mounted on said semi-trailer body and
   (b) a second pair of legs mounted on said forward cargo-carrying body.

31. A cargo-carrying vehicle as recited in claim 30 wherein said second pair of legs is mounted on said forward cargo-carrying body so as to permit said second pair of legs to be hinged or telescoped away from the center line of said forward cargo-carrying body to a distance that permits said long-wheelbase tractor's rear wheels to pass, thus enabling said rear wheels to clear.

32. A cargo-carrying vehicle comprising:
   (a) a forward cargo-carrying body;
   (b) a rearward cargo-carrying body, said rearward cargo-carrying body having a rear loading and unloading entrance;
   (c) first means for locking said forward cargo-carrying body and said rearward cargo-carrying together so that said forward and rearward cargo-carrying bodies can be backed as one unit;
   (d) a pivoting frame mounted on the under side of said rearward cargo-carrying vehicle for pivotal movement about an axis that is transverse to said rearward cargo-carrying body and that is spaced forwardly of said rear loading and unloading entrance on said rearward cargo-carrying body;
   (e) at least one pair of ground-engaging wheels mounted on said pivoting frame; and
   (f) third means for pivoting said rearward cargo-carrying body about said axis.

33. A cargo-carrying vehicle as recited in claim 32 wherein:

(a) said forward cargo-carrying body is a semitrailer body and
(b) said rearward cargo-carrying body is a full trailer body.

34. A cargo-carrying vehicle as recited in claim 32 wherein said forward cargo-carrying body is a long-wheelbase tractor with a demountable cargo-carrying body.

35. A cargo-carrying vehicle as recited on claim 34 wherein said rearward cargo-carrying body is a full trailer body.

36. A cargo-carrying vehicle as recited in claim 34 wherein said rearward cargo-carrying body in a semi-trailer body.

37. A cargo-carrying vehicle as recited in claim 32 wherein said first means comprise:
(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body;
(b) a housing sized, shaped, and positioned to receive said tow bar telescopically when said forward and rearward cargo-carrying bodies are locked together;
(c) four bearing blocks mounted on the four corners of one of said cargo-carrying bodies facing the other one of said cargo-carrying bodies; and
(d) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

38. A cargo-carrying vehicle as recited in claim 37 and further comprising second means for pulling said tow bar into said housing.

39. A cargo-carrying vehicle as recited in claim 38 wherein said second means comprise a fluid jack mounted on one of said forward and rearward cargo-carrying bodies.

40. A cargo-carrying vehicle as recited in claim 32 wherein said third means apply a force to said pivoting frame and a corresponding force to said rearward cargo-carrying body to cause said pivoting frame and said rearward cargo-carrying body to pivot relative to each other about said axis.

41. A cargo-carrying vehicle as recited in claim 40 wherein said third means comprise fluid operated bellows mounted between said pivoting frame and said rearward cargo-carrying body and spaced from said axis.

42. A cargo-carrying vehicle as recited in claim 32 wherein said first means comprise:
(a) a dolly on which at least one pair of forward ground-engaging wheels associated with said rear cargo-carrying body is mounted and
(b) a fifth wheel slideably mounted on the upper surface of said dolly.

43. A cargo-carrying vehicle as recited in claim 32 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

44. A cargo-carrying vehicle as recited in claim 32 wherein:
(a) said forward cargo-carrying body has a rear loading and unloading entrance;
(b) said rearward cargo-carrying body has a forward loading and unloading entrance; and
(c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

45. A cargo-carrying vehicle as recited in claim 32 wherein:
(a) said forward cargo-carrying body is a demountable cargo-carrying body detachably mounted on the frame of a long-wheelbase tractor;
(b) a locking device is mounted on said frame in position to engage said demountable cargo-carrying body;
(c) said rearward cargo-carrying body is a semi-trailer body; and
(d) a fifth wheel is mounted on said frame in position to engage said rearward cargo-carrying body.

46. A cargo-carrying vehicle as recited in claim 45 wherein said fifth wheel is slideable relative to said frame for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

47. A cargo-carrying vehicle as recited in claim 45 and further comprising:
(a) a first pair of legs mounted on said semi-trailer body and
(b) a second pair of legs mounted on said demountable cargo-carrying body.

48. A cargo-carrying vehicle as recited in claim 47 wherein said second pair of legs is mounted on said demountable cargo-carrying body so as to permit said second pair of legs to be hinged or telescoped away from the center line of said demountable cargo-carrying body to a distance that permits said long-wheelbase tractor's rear wheels to pass, thus enabling said rear wheels to clear.

49. A cargo-carrying vehicle comprising:
(a) a forward cargo-carrying body;
(b) a rearward cargo-carrying body;
(c) first means for locking said forward cargo-carrying body and said rearward cargo-carrying together so that said forward and rearward cargo-carrying bodies can be backed as one unit;
(d) at least one pair of rear ground-engaging wheels mounted on said forward cargo-carrying body;
(e) at least one pair of forward ground-engaging wheels mounted on said rearward cargo-carrying body; and (f) fourth means for unweighting said at least one pair of rear ground-engaging wheels on said forward cargo-carrying body and said at least one pair of forward ground-engaging wheels on said rearward cargo-carrying body when said forward and rearward cargo-carrying bodies are to be backed as one unit.

50. A cargo-carrying vehicle as recited in claim 49 wherein:
    (a) said forward cargo-carrying body is a semitrailer body and
    (b) said rearward cargo-carrying body is a full trailer body.

51. A cargo-carrying vehicle as recited in claim 49 wherein said forward cargo-carrying body is a long-wheelbase tractor with a demountable cargo-carrying body.

52. A cargo-carrying vehicle as recited on claim 51 wherein said rearward cargo-carrying body is a full trailer body.

53. A cargo-carrying vehicle as recited in claim 51 wherein said rearward cargo-carrying body in a semi-trailer body.

54. A cargo-carrying vehicle as recited in claim 49 wherein said first means comprise:
    (a) a tow bar which, when said forward and rearward cargo-carrying bodies are in their normal, over-the-road relationship, spaces said cargo-carrying bodies and permits said rearward cargo-carrying body to articulate relative to said forward cargo-carrying body;
    (b) a housing sized, shaped, and positioned to receive said tow bar telescopically when said forward and rearward cargo-carrying bodies are locked together;
    (c) four bearing blocks mounted on the four corners of one of said cargo-carrying bodies facing the other one of said cargo-carrying bodies; and
    (d) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

55. A cargo-carrying vehicle as recited in claim 54 and further comprising second means for pulling said tow bar into said housing.

56. A cargo-carrying vehicle as recited in claim 55 wherein said second means comprise a fluid jack mounted on one of said forward and rearward cargo-carrying bodies.

57. A cargo-carrying vehicle as recited in claim 49 wherein said rearward cargo body has at least one pair of rear ground-engaging wheels and a rear loading and unloading entrance.

58. A cargo-carrying vehicle as recited in claim 49 wherein said first means comprise:
    (a) a dolly on which said at least one pair of forward ground-engaging wheels on said rear cargo-carrying body is mounted and
    (b) a fifth wheel slideably mounted on the upper surface of said dolly.

59. A cargo-carrying vehicle as recited in claim 49 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

60. A cargo-carrying vehicle as recited in claim 49 wherein:
    (a) said forward cargo-carrying body has a rear loading and unloading entrance;
    (b) said rearward cargo-carrying body has a forward loading and unloading entrance; and
    (c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

61. A cargo-carrying vehicle as recited in claim 49 wherein:
    (a) said forward cargo-carrying body is a demountable cargo-carrying body detachably mounted on the frame of a long-wheelbase tractor;
    (b) a locking device is mounted on said frame in position to engage said demountable cargo-carrying body;
    (c) said rearward cargo-carrying body is a semi-trailer body; and
    (d) a fifth wheel is mounted on said frame in position to engage said rearward cargo-carrying body.

62. A cargo-carrying vehicle as recited in claim 61 wherein said fifth wheel is slideable relative to said frame for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

63. A cargo-carrying vehicle as recited in claim 61 and further comprising:
    (a) a first pair of legs mounted on said semi-trailer body and
    (b) a second pair of legs mounted on said demountable cargo-carrying body.

64. A cargo-carrying vehicle as recited in claim 63 wherein said second pair of legs is mounted on said demountable cargo-carrying body so as to permit said second pair of legs to be hinged or telescoped away from the center line of said demountable cargo-carrying body to a distance that permits said long-wheelbase tractor's rear wheels to pass, thus enabling said rear wheels to clear.

65. A cargo-carrying vehicle comprising:
    (a) a forward cargo-carrying body;
    (b) a rearward cargo-carrying body;
    (c) first means for locking said forward cargo-carrying body and said rearward cargo-carrying together so that said forward and rearward cargo-carrying bodies can be backed as one unit;
    (d) at least one pair of rear ground-engaging wheels mounted on said forward cargo-carrying body; and (e) at least one pair of forward ground-engaging wheels mounted on said rearward cargo-carrying body;

wherein:

(f) said at least one pair of rear ground-engaging wheels on said forward cargo-carrying body and said at least one pair of forward ground-engaging wheels on said rearward cargo-carrying body are both mounted on pneumatic springs and (g) said pneumatic springs can be deflated when said forward and rearward cargo-carrying bodies are to be backed as one unit.

66. A cargo-carrying vehicle as recited in claim 65 wherein:

(a) said forward cargo-carrying body is a semitrailer body and (b) said rearward cargo-carrying body is a full trailer body.

67. A cargo-carrying vehicle as recited in claim 65 wherein said forward cargo-carrying body is a long-wheelbase tractor with a demountable cargo-carrying body.

68. A cargo-carrying vehicle as recited in claim 67 wherein said rearward cargo-carrying body is a full trailer body.

69. A cargo-carrying vehicle as recited in claim 67 wherein said rearward cargo-carrying body in a semi-trailer body.

70. A cargo-carrying vehicle as recited in claim 65 wherein said first means comprise:

(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body;

(b) a housing sized, shaped, and positioned to receive said tow bar telescopically when said forward and rearward cargo-carrying bodies are locked together;

(c) four bearing blocks mounted on the four corners of one of said cargo-carrying bodies facing the other one of said cargo-carrying bodies; and (d) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

71. A cargo-carrying vehicle as recited in claim 70 and further comprising second means for pulling said tow bar into said housing.

72. A cargo-carrying vehicle as recited in claim 71 wherein said second means comprise a fluid jack mounted on one of said forward and rearward cargo-carrying bodies.

73. A cargo-carrying vehicle as recited in claim 65 wherein said rearward cargo-carrying body has at least one pair of rear ground-engaging wheels and a rear loading and unloading entrance.

74. A cargo-carrying vehicle as recited in claim 65 wherein said first means comprise:

(a) a dolly on which said at least one pair of forward ground-engaging wheels on said rear cargo-carrying body is mounted and (b) a fifth wheel slideably mounted on the upper surface of said dolly.

75. A cargo-carrying vehicle as recited in claim 65 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

76. A cargo-carrying vehicle as recited in claim 65 wherein:

(a) said forward cargo-carrying body has a rear loading and unloading entrance;

(b) said rearward cargo-carrying body has a forward loading and unloading entrance; and (c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

77. A cargo-carrying vehicle as recited in claim 65 wherein:

(a) said forward cargo-carrying body is a demountable cargo-carrying body detachably mounted on the frame of a long-wheelbase tractor;

(b) a locking device is mounted on said frame in position to engage said demountable cargo-carrying body;

(c) said rearward cargo-carrying body is a semi-trailer body; and (d) a fifth wheel is mounted on said frame in position to engage said rearward cargo-carrying body.

78. A cargo-carrying vehicle as recited in claim 77 wherein said fifth wheel is slideable relative to said frame for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

79. A cargo-carrying vehicle as recited in claim 77 and further comprising:

(a) a first pair of legs mounted on said semi-trailer body and (b) a second pair of legs mounted on said demountable cargo-carrying body.

80. A cargo-carrying vehicle as recited in claim 79 wherein said second pair of legs is mounted on said demountable cargo-carrying body so as to permit said second pair of legs to be hinged or telescoped away from the center line of said demountable cargo-carrying body to a distance that permits said long-wheelbase tractor's rear wheels to pass, thus enabling said rear wheels to clear.

81. A cargo-carrying vehicle comprising:

(a) a forward cargo-carrying body;

(b) a rearward cargo-carrying body; and (c) first means for locking said forward cargo-carrying body and said rearward cargo-carrying together;

wherein:
(d) said forward cargo-carrying body is a demountable cargo-carrying body detachably mounted on a long-wheelbase tractor having a lower-than-normal frame and
(e) said forward cargo-carrying body has a notch sized, shaped, and positioned:
 (i) to provide clearance for a drive shaft or transmission leading to rear ground-engaging wheels on said frame and
 (ii) to provide a normal height king pin on said cargo-cargo carrying body.

82. A cargo-carrying vehicle as recited on claim 81 wherein said rearward cargo-carrying body is a full trailer body.

83. A cargo-carrying vehicle as recited in claim 81 wherein said rearward cargo-carrying body in a semi-trailer body.

84. A cargo-carrying vehicle as recited in claim 81 wherein said first means comprise:
(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body;
(b) a housing sized, shaped, and positioned to receive said tow bar telescopically when said forward and rearward cargo-carrying bodies are locked together;
(c) four bearing blocks mounted on the four corners of one of said cargo-carrying bodies facing the other one of said cargo-carrying bodies; and
(d) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

85. A cargo-carrying vehicle as recited in claim 84 and further comprising second means for pulling said tow bar into said housing.

86. A cargo-carrying vehicle as recited in claim 85 wherein said second means comprise a fluid jack mounted on one of said forward and rearward cargo-carrying bodies.

87. A cargo-carrying vehicle as recited in claim 81 wherein:
(a) said forward cargo-carrying body has at least one pair of rear ground-engaging wheels and
(b) said rearward cargo body has at least one pair of forward ground-engaging wheels, at least one pair of rear ground-engaging wheels, and a rear loading and unloading entrance.

88. A cargo-carrying vehicle as recited in claim 81 wherein:
(a) said forward cargo-carrying body has at least one pair of rear ground-engaging wheels;
(b) said rearward cargo-carrying body has at least one pair of forward ground-engaging wheels; and
(c) said first means comprise:
 (i) a dolly on which said at least one pair of forward ground-engaging wheels on said rear cargo-carrying body is mounted and
 (ii) a fifth wheel slideably mounted on the upper surface of said dolly.

89. A cargo-carrying vehicle as recited in claim 81 and further comprising fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

90. A cargo-carrying vehicle as recited in claim 81 wherein:
(a) said forward cargo-carrying body has a rear loading and unloading entrance;
(b) said rearward cargo-carrying body has a forward loading and unloading entrance; and
(c) the cargo-carrying vehicle further comprises sixth means for opening said rear loading and unloading entrance on said forward cargo-carrying body and said forward loading and unloading entrance on said rearward cargo-carrying body when said first means has locked said forward cargo-carrying body and said rearward cargo-carrying body together.

91. A cargo-carrying vehicle as recited in claim 81 wherein:
(a) a locking device is mounted on said long-wheelbase tractor in position to engage said demountable cargo-carrying body;
(b) said rearward cargo-carrying body is a semi-trailer body; and
(c) a fifth wheel is mounted on said long-wheelbase tractor in position to engage said rearward cargo-carrying body.

92. A cargo-carrying vehicle as recited in claim 91 wherein said fifth wheel is slideable relative to said long-wheelbase tractor for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

93. A cargo-carrying vehicle as recited in claim 91 and further comprising:
(a) a first pair of legs mounted on said semi-trailer body and
(b) a second pair of legs mounted on said demountable cargo-carrying body.

94. A cargo-carrying vehicle as recited in claim 93 wherein said second pair of legs is mounted on said demountable cargo-carrying body so as to permit said second pair of legs to be hinged or telescoped away from the center lne of said demountable cargo-carrying body to a distance that permits said long-wheelbase tractor's rear wheels to pass, thus enabling said rear wheels to clear.

95. A cargo-carrying vehicle comprising:
(a) a forward cargo-carrying body;
(b) a rearward cargo-carrying body;
(c) first means for locking said forward cargo-carrying body and said rearward cargo-carrying body together; and (d) a fifth means for providing at least three spacings between said forward cargo-carrying body and said rearward cargo-carrying body: a minimum spacing in which said forward cargo-carrying body and said rearward cargo-carrying body are locked together by said first means, a maximum spacing permitting said forward cargo-carrying body and said rearward cargo-carrying body to be pivoted at least nearly perpendicularly to each other, and an intermediate spacing for over-the-road use.

96. A cargo-carrying vehicle comprising:
(a) a forward cargo-carrying body;
(b) a rearward cargo-carrying body that, during over-the-road use of said cargo-carrying vehicle, is spaced from and is pivotable independently of said forward cargo-carrying body; and
(c) first means for locking said forward cargo-carrying body directly to said rearward cargo-carrying body so that they may be pivoted as a unit but cannot move vertically relative to one another.

97. A cargo-carrying vehicle comprising:
(a) a long-wheelbase tractor having a fifth wheel;
(b) a demountable cargo-carrying body detachably mounted on said long-wheelbase tractor;
(c) a rearward cargo-carrying body;
(d) first means for locking said forward cargo-carrying body and said rearward cargo-carrying body together; and
(e) a pair of legs mounted on said demountable cargo-carrying body:
  (i) so as to permit said pair of legs to be hinged or telescoped away from the center line of said demountable cargo-carrying body to a distance that permits said long-wheelbase tractor's rear wheels to pass and
  (ii) so as to permit said demountable cargo-carrying body to be jacked up so that the fifth wheel of said long-wheelbase tractor clears the underside of said demountable cargo-carrying body as said long-wheelbase tractor pulls out.

98. A cargo-carrying vehicle comprising:
(a) a forward cargo-carrying body;
(b) a rearward cargo-carrying body that, during over-the-road use of said cargo-carrying vehicle, is spaced from and is pivotable independently of said forward cargo-carrying body; and
(c) first means for locking said forward cargo-carrying body directly to said rearward cargo-carrying body so that the floors of said forward and rearward cargo-carrying bodies cannot move vertically relative to one another.

99. A cargo-carrying vehicle comprising:
(a) a truck frame equipped with a fifth wheel;
(b) a forward cargo-carrying body, said forward cargo-carrying body having a rear door, being detachably mounted on said truck frame, and being equipped with a king pin;
(c) a rearward cargo-carrying body detachably connected to said fifth wheel on said truck frame, said rearward cargo-carrying body having a front door and a rear door;
(d) first means for locking said forward cargo-carrying body and said rearward cargo-carrying body together for purposes of backing, handling, and loading; and
(e) fifth means for providing at least two spacings between said forward cargo-carrying body and said rearward cargo-carrying body: a minimum spacing in which said forward cargo-carrying body and said rearward cargo-carrying body are locked together by said first means and a maximum spacing permitting said forware cargo-carrying body and said rearward cargo-carrying body to be pivoted at least nearly perpendicularly to each other.

100. A cargo-carrying vehicle as recited in claim 99 wherein said fifth means also provides a third spacing between said forward cargo-carrying body and said rearward cargo-carrying body: an intermediate spacing for over-the-road use.

101. A cargo-carrying vehicle as recited in claim 99 wherein said forward cargo-carrying body has at least one ground-engaging support leg on each side thereof, said ground-engaging support legs being extendable outwardlky to allow truck wheels to pass therebetween.

102. A cargo-carrying vehicle as recited in claim 101 wherein said ground-engaging support legs are permanently attached to said forward cargo-carrying body.

103. A cargo-carrying vehicle as recited in claim 101 wherein said ground-engaging support legs are detachable from said forward cargo-carrying body.

104. A cargo-carrying vehicle as recited in claim 101 wherein said ground-engaging support legs are self-jacking.

105. A cargo-carrying vehicle as recited in claim 99 wherein said king pin is removable.

106. A cargo-carrying vehicle as recited in claim 99 wherein said fifth wheel on said truck frame is slidable longitudinally on said truck frame.

107. A cargo-carrying vehicle as recited in claim 99 wherein said fifth means comprise:
(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body and
(b) a housing sized, shaped, and positioned to receive said tow bar telescopically when said forward and rearward cargo-carrying bodies are locked together.

108. A cargo-carrying vehicle as recited in claim 107 and further comprising second means for pulling said tow bar into said housing.

109. A cargo-carrying vehicle as recited in claim 108 wherein said second means comprise a fluid jack mounted on one of said forward and rearward cargo-carrying bodies.

110. A cargo-carrying vehicle as recited in claim 99 wherein said first means comprise:
(a) four bearing blocks mounted on the four corners of one of said cargo-carrying bodies facing the other one of said cargo-carrying bodies and
(b) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

111. A cargo-carrying vehicle as recited in claim 99 wherein said rearward cargo-carrying body is a semi-trailer body having a fifth wheel pin that engages said fifth wheel on said truck frame.

112. A cargo-carrying vehicle as recited in claim 111 wherein said fifth wheel on said truck frame is slidable longitudinally on said truck frame.

113. A cargo-carrying vehicle as recited in claim 99 wherein:
(a) said rearward cargo-carrying body is a semi-trailer body;
(b) said cargo-carrying vehicle further comprises a wheeled dolly having a fifth wheel coupler, said wheeled dolly carrying the front end of said rearward cargo-carrying vehicle; and
(c) said rearward cargo-carrying body has a king pin that engages said fifth wheel coupler on said wheeled dolly.

114. A cargo-carrying vehicle as recited in claim 113 wherein said fifth means comprise:
(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body and
(b) a housing sized, shaped, and positioned to receive said tow bar telescopically when said forward and rearward cargo-carrying bodies are locked together,
(c) one of said tow bar and said housing being mounted on said wheeled dolly.

115. A cargo-carrying vehicle as recited in claim 113 wherein said fifth means comprise a sliding fifth wheel mounted on said wheeled dolly.

116. A cargo-carrying vehicle as recited in claim 99 and further comprising seventh means for elevating the rear end of said rearward cargo-carrying body when said forward and rearward cargo-carrying bodies are locked together by said first means.

117. A cargo-carrying vehicle as recited in claim 116 wherein said seventh means comprise fluid jacks.

118. A cargo-carrying vehicle as recited in claim 117 wherein said fluid jacks act between said rearward cargo-carrying body and the ground.

119. A cargo-carrying vehicle as recited in claim 117 wherein:
(a) said rearward cargo-carrying body has at least one pair of rearward ground-engaging wheels mounted on axles and
(b) said fluid jacks act between said axles and the body of said rearward cargo-carrying body.

120. A cargo-carrying vehicle comprising:
(a) a forward cargo-carrying body, said forward cargo-carrying body having a rear door and being equipped with a first king pin;
(b) a rearward cargo-carrying body, said rearward cargo-carrying body having a front door and a rear door and being equipped with a second king pin;
(c) first means for locking said forward cargo-carrying body and said rearward cargo-carrying body together for purposes of backing, handling, and loading without the use of a common frame underlying said forward and rearward cargo-carrying bodies; and
(d) fifth means for providing at least two spacings between said forward cargo-carrying body and said rearward cargo-carrying body: a minimum spacing in which said forward cargo-carrying body and said rearward cargo-body are locked together by said first means and a maximum spacing permitting said forward cargo-carrying body and said rearward cargo-carrying body to be pivoted at least nearly perpendicularly to each other, whereby:
(e) said cargo-carrying vehicle can be driven over the road with a long-wheelbase tractor equipped with a fifth wheel that engages said second king pin and
(f) said cargo-carrying vehicle can be driven around a freight yard with a short-wheelbase tractor equipped with a fifth wheel that engages said first king pin.

121. A cargo-carrying vehicle as recited in claim 120 wherein said fifth means also provides a third spacing between said forward cargo-carrying body and said rearward cargo-carrying body: an intermediate spacing for over-the-road use.

122. A cargo-carrying vehicle as recited in claim 121 wherein said forward cargo-carrying body has at least one ground-engaging support leg on each side thereof, said ground-engaging support legs being extendable outwardly to allow truck wheels to pass therebetween.

123. A cargo-carrying vehicle as recited in claim 122 wherein said ground-engaging support legs are permanently attached to said forward cargo-carrying body.

124. A cargo-carrying vehicle as recited in claim 122 wherein said ground-engaging support legs are detachable from said forward cargo-carrying body.

125. A cargo-carrying vehicle as recited in claim 122 wherein said ground-engaging support legs are self-jacking.

126. A cargo-carrying vehicle as recited in claim 120 wherein said first king pin is removable.

127. A cargo-carrying vehicle as recited in claim 120 wherein said first means comprise:
(a) four bearing blocks mounted on the four corners of one of said cargo-carrying bodies facing the other one of said cargo-carrying bodies and
(b) four bearing blocks mounted on the four corners of said other one of said cargo-carrying bodies facing said one of said cargo-carrying bodies, said bearing blocks on said two cargo-carrying bodies being sized, shaped, and positioned to mate with each other to lock said cargo-carrying bodies together.

128. A cargo-carrying vehicle as recited in claim 120 wherein:
(a) said rearward cargo-carrying body is a semi-trailer body;
(b) said cargo-carrying vehicle further comprises a wheeled dolly having a fifth wheel coupling, said wheeled dolly carrying the front end of said rearward cargo-carrying vehicle; and
(c) said second king pin engages said fifth wheel coupling on said wheeled dolly.

129. A cargo-carrying vehicle as recited in claim 128 wherein said fifth means comprise:
(a) a tow bar which, when said forward and rearward cargo-carrying bodies are in their normal, over-the-road relationship, spaces said cargo-carrying bodies and permits said rearward cargo-carrying body to articulate relative to said forward cargo-carrying body and
(b) a housing sized, shaped, and positioned to receive said two bar telescopically when said forward and rearward cargo-carrying bodies are locked together,
(c) one of said tow bar and said housing being mounted on said wheeled dolly.

130. A cargo-carrying vehicle as recited in claim 128 wherein said fifth means comprises a sliding fifth wheel mounted on said wheeled dolly.

131. A cargo-carrying vehicle as recited in claim 120 and further comprising seventh means for elevating the rear end of said rearward cargo-carrying body when said forward and rearward cargo-carrying bodies are locked together by said first means.

132. A cargo-carrying vehicle as recited in claim 131 wherein said seventh means comprise fluid jacks.

133. A cargo-carrying vehicle as recited in claim 132 wherein said fluid jacks act between said rearward cargo-carrying body and the ground.

134. A cargo-carrying vehicle as recited in claim 132 wherein:
(a) said rearward cargo-carrying body has at least one pair of rearward ground-engaging wheels mounted on axles and
(b) said fluid jacks act between said axles and the body of said rearward cargo-carrying body.

* * * * *